United States Patent [19]

Wilkins

[11] Patent Number: 5,201,131
[45] Date of Patent: Apr. 13, 1993

[54] COORDINATE MEASURING MACHINE

[76] Inventor: Larry C. Wilkins, 1601 Hedden Ct., New Albany, Ind. 47150

[21] Appl. No.: 512,977

[22] Filed: Apr. 23, 1990

[51] Int. Cl.$^5$ .............................................. G01B 5/00
[52] U.S. Cl. ........................................ 33/556; 33/557; 33/1 M
[58] Field of Search ................ 33/556, 555, 557, 1 M, 33/503, 559, 501.04, 501.2, 501.5, 644, 550, 551, 832, 501.05, 558.4

[56] References Cited

U.S. PATENT DOCUMENTS

| | | | |
|---|---|---|---|
| 2,371,451 | 3/1945 | Larson | 33/556 |
| 2,637,116 | 5/1953 | Wiebe | 33/557 |
| 2,789,693 | 4/1957 | Harder | 33/557 |
| 3,241,243 | 3/1966 | Speer | 33/1 M |
| 3,613,090 | 10/1971 | Mason | 33/1 M |
| 3,990,153 | 11/1976 | Calame | 33/503 |
| 4,848,004 | 7/1989 | Wilkins | 33/1 M |
| 4,961,267 | 10/1990 | Herzog | 33/1 M |

Primary Examiner—William A. Cuchlinski, Jr.
Assistant Examiner—C. W. Fulton
Attorney, Agent, or Firm—Woodard, Emhardt, Naughton, Moriarty & McNett

[57] ABSTRACT

A gage assembly has a frame including a base fastened to a fixture on a table to which workpieces are to be brought for gaging. Digital electronic gages are secured to the frame and have gage-operating plungers extending in the X-axis and Y-axis directions. The plunger axes are coplanar and intersect in the center of a hole in the frame base through which a pneumatically-operated conical ended probe extends. The gage plungers are resiliently biased against a probe ring that is coaxial with the probe cone and is mounted on articulated pivot arms so that the gages are operated in response to random horizontal movement of the probe ring as the probe point enters and centers in a hole whose location in a workpiece is being checked to about a second axis parallel to the first axis.

10 Claims, 5 Drawing Sheets

COORDINATE MEASURING MACHINE

BACKGROUND OF THE INVENTION

1. Field of the Invention

This invention relates generally to gaging of physical dimensions of manufactured products, and more particularly to a gage assembly mountable to a fixture or machine and used in a production situation where parts are placed in front of the gage and, when the gage is activated, the gage will indicate the coordinate locations of selected features on a part.

2. Description of the Prior Art

The gaging art is highly developed and has become very sophisticated in view of requirements for obtaining and maintaining precise dimensions and close tolerances in some manufactured products. But there are situations where the expense that is sometimes incurred in the use of highly sophisticated gaging techniques, cannot be justified, either due to the relatively low volume of parts to be produced, the relatively large tolerances that can be accepted, the relatively low cost of scrap, or for other reasons. On the other hand, simple "go" or "no-go" gaging is not necessarily acceptable because operators can have no way to detect a trend of dimension between a "go" and "no-go" situation, and have no useful input for application of statistical process control techniques to the manufacturing operation. Therefore, there has remained a need for relatively inexpensive gaging readily adaptable to measurement of a variety of dimensions within reasonably close tolerances and providing output to remote monitors and dataprocessing equipment. My U.S. Pat. No. 4,525,931, issued Jul. 2, 1985 illustrates the use of a dial indicator gage assembly for measurement of parts and wherein the dial indicator gage itself is protected from damage upon application of the gage to the part or workpiece. That same technique is applicable to indicator gages which have a digital display on them and a useful output to electronic data-processing equipment. An example is "The Fowler Ultra Digit" electronic indicator made in England and which can produce an output to a suitable data collector such as the DataMyte Model 352 by DataMyte Corporation of 14960 Industrial Road, Minnetonka, Minnesota 55345. My U.S. Pat. No. 4,848,004 discloses an improvement in accurate co-ordinate measurement. In that device a slide assembly is mounted to the base, and a gage is mounted to the base. A gage actuator is operably associated with the movable element of the slide assembly, to provide a gage response to the position of the movable element. A part-engageable probe is also associated with the moveable element of the slide so that position of a feature of the part relative to some reference, can be detected and indicated by the gage. The components are provided in modular form, so two additional axes and associated gages and slides can be employed. The present invention is a further advance in gaging but at a lower cost.

SUMMARY OF THE INVENTION

Described briefly, according to a typical embodiment of the present invention, a gage assembly is provided with a frame including a base fastened to a fixture on a table to which workpieces are to be brought for gaging. A first gage is secured to the frame and has a gage-operating plunger extending in the X-axis direction. A second gage is secured to the frame and has a gage-operating plunger extending in the Y-axis direction. The plungers of the two gages have coplanar horizontal axes.

A first pivot arm is mounted to the frame to pivot about a first Z-axis perpendicular to the a plane containing the X-axis and Y-axis plungers. A second pivot arm is mounted to the first pivot arm to pivot about a second axis parallel to the first axis. A Z-axis probe guide is secured to the second arm as is a powered probe drive actuator having an output member which is fluid-drivable in the Z-axis direction. A Z-axis probe shaft is connected to the actuator output member and is slidably mounted to the probe guide to slide in the Z-axis direction.

A cylindrical surface concentric with the probe axis, and whose cylindrical surface is cylindrical about an axis perpendicular to the plane of the gage plunger axes, is mounted on the second arm and is engaged by the plunger anvils of the gages so that, as the conical end of the probe shaft enters a hole to be checked, the position of the axis of the probe and, therefore, the position of the hole center, can be indicated by the gages. When the measurement is done, the fluid pressure is removed from the actuator and the probe is retracted.

DESCRIPTION OF THE PREFERRED EMBODIMENT

Figure 1:
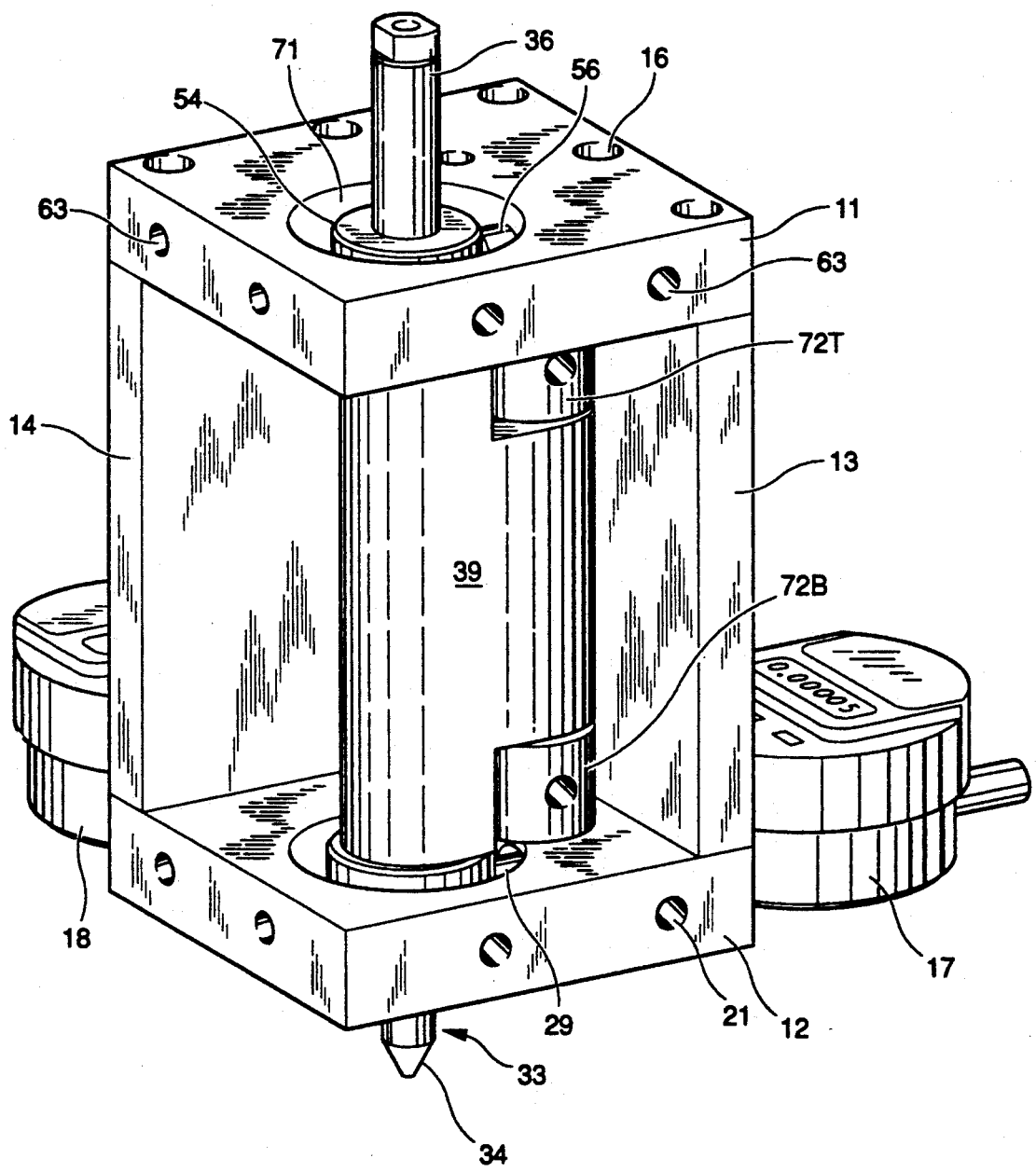
FIG. 1 is a pictorial view of a gage assembly according to a typical embodiment of the present invention.
Figure 2:
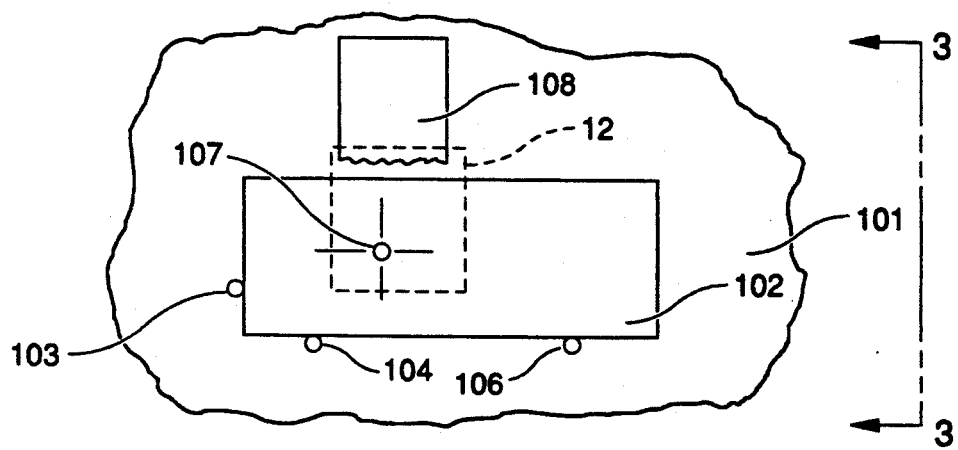
FIG. 2 is a small scale top plan view of an inspection table with a workpiece and a gage mount to show the set-up.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to the drawings in detail, the gage assembly includes two end caps 11 and 12 which, in the illustrated embodiment, are vertically spaced by two plates 13 and 14 mounted at right angles to each other and fastened to the top end cap by five screws at the holes such as 16 and to the bottom end cap by five screws at identically located holes. This provides a rigid structure serving as a frame for the gage assembly. Two indicator gages 17 and 18 are mounted to the end cap 12 which will hereafter be referred to as the base. Each of the gages has a mounting stem or boss such as 24 for gage 17 received in a split bushing such as 19 received in hole 23 in base 12 and secured in place by a set screw 21 screwed into the base. The axis 22 of the hole 23 in base 12, and which receives the mounting boss and sleeve for gage 17, is perpendicular to the axis 26 of hole 27 in base 12 and which receives the sleeve and mounting boss 28 of gage 18. Since the gage plungers such as 29 for gage 17 and 31 for gage 18 are concentric with the mounting bosses 24 and 28, respectively, and the axes 22 and 26 intersect in the center of the large hole 32 in the base, the plunger axes are at right angles and in a plane parallel to the bottom of the base and the gages are capable of measuring X-axis and Y-axis movements.

Figure 3:
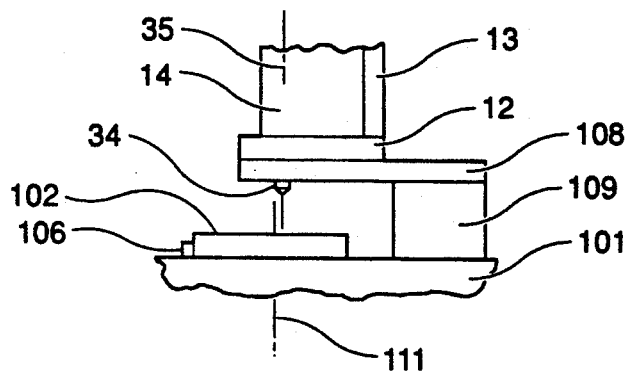
FIG. 3 is an elevational view taken at line 3—3 in FIG. 2 and viewed in the direction of the arrows and showing fragmentarily, the gage assembly mounted to the table in place for inspection of the workpiece.
Figure 5:
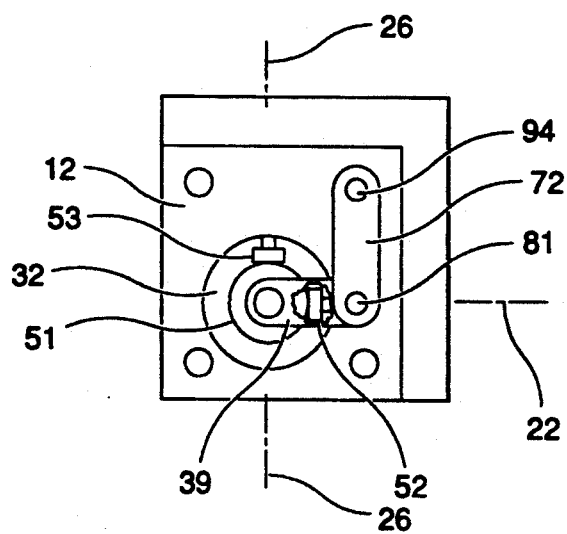
FIG. 5 is a top plan view of the gage assembly with the top end cap removed.
Figure 6:
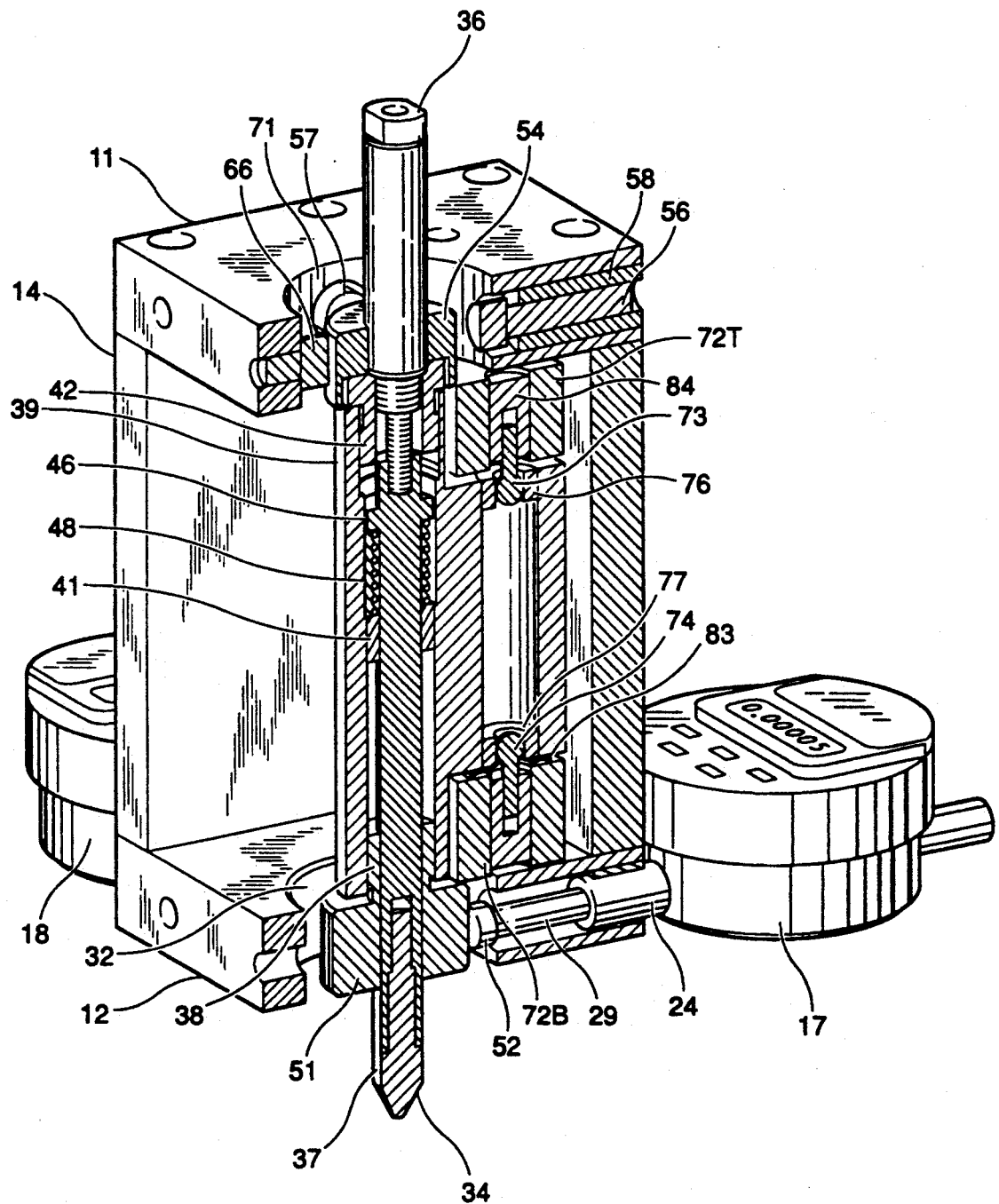
FIG. 6 is a pictorial vertical section taken on a vertical plane containing the X-axis plunger axis 22.

Probe 33 has a conical tip 34 at its lower end and which can be driven downward by a pneumatic cylinder 36. The probe is screwed into the lower end of a probe shaft 37 slidably and precisely received through a bushing 38 secured inside the lower end of a probe-mounting arm 39. A top shaft bushing 41 is mounted inside arm 39 near the top and slidingly receives the shaft 37 through it. A cylinder bushing 42 is screwed into the top of the arm 39. A pneumatic cylinder 43 is screwed into the bushing 42. The piston rod 44 of the cylinder is screwed into the top end of shaft 37. A collar 46 near the top end of the shaft 37 is engaged by the upper end of a return spring 48, the lower end of which rests on top of the bushing 41. Thus, the probe shaft and thereby the probe is normally held upward in the position shown in FIGS. 3 and 6 by the spring 48.

The bushing 38 at the bottom of the arm 39 has a cylindrical surface 51 on it which is precision ground concentric with the probe shaft guide bushing hole in the center and is engaged by the end faces of the anvils 52 and 53 of the plungers of the X-axis gage 17 and Y-axis gage 18, respectively. A similar ring 54 is mounted around the cylinder 43 at the upper end of arm 39 and, therefore, is centered on the probe axis 35 as is the precision cylindrical anvil surface 51. But ring 54 need not be as precise, since it merely serves as a limiter of horizontal travel. It cooperates with anvils 56 and 57 which are screwed into anvil plugs 58 and 59 received in holes 61 and 62, respectively, in the top cap 11. The longitudinal position of the plugs 58 and 59 in the respective holes 61 and 62 can be adjusted and then set in place by the set screws 63. Additional anvils 64 and 66 may be screwed into the top end cap 11 into the holes 67 and 68, respectively, from inside the large hole 71 in the top end cap. Thus, the four anvils 56, 57, 64 and 66 are engageable by the travel limiter ring and provide limiting stops at 90° with respect to each other to limit the amount of horizontal travel of the anvil in any direction, and thus avoid over-travel of the plungers on the indicators 17 and 18.

The arm 39 is mounted on an arm 72 which is configured in something of a yoke form with a "knuckle" 72T at the top and "knuckle" 72B at the bottom. Tooling balls 73 and 74 are mounted in the knuckles 72T and 72B, respectively. Tooling ball receiver anvil bushings 76 and 77 are received in sockets in the top surface 78 and bottom surface 79 of the arm 39. As thus assembled, this arm 39 is inserted in the yoke between the knuckles 72T and 72B of the primary arm 72 whereupon the tooling ball 73 is screwed down through the hole 81 in knuckle 72T, and tooling ball 74 is screwed upwardly from the bottom in the hole 82 in knuckle 72B. When the balls are received in the holes in the bushings 76 and 77, respectively, the arms 39 and 72 are pivotally mounted to each other. A wave spring 83 can be mounted between the lower face 79 of arm 39 and the upper face of knuckle 72B to avoid looseness. The tooling balls may have slots in their ends opposite the balls as shown at 84, for example, for ball 73, to facilitate installation by screwdriver.

The primary arm 72 is mounted in the frame in essentially the same manner. It has ball anvil bushings 86 and 87 received in sockets in the upper and lower ends of arm 72. A wave spring 88 is located under the lower end. Tooling balls 89 and 91 are inserted down through the hole 92 in top end cap 11 and upwardly through hole 93 in the bottom end cap 12, respectively, and are received in the bushings 86 and 87, respectively, to mount the primary arm 72 in the frame to pivot on axis 94. The axis 94 is perpendicular to the plane containing the X and Y axes 22 and 26 of the gage plungers.

The tooling balls can be fixed in their established locations in the arms 72 by set screws 96 and in the base plate end cap by set screw 97 and in the top end cap by set screw 98.

OPERATION

In the operation of the device, the work may be done on the top of a table 101 where a workpiece 102 may be positioned against reference locators 103, 104 and 106. The objective is to determine whether the hole 107 in the workpiece is properly located in the X-axis direction with reference to the locator 103, and in the Y-axis direction with reference to locators 104 and 106. The gage assembly of the present invention is mounted on a horizontal plate 108 (FIG. 3) mounted atop a riser block 109 whereby the base 12 of the gage assembly extends over the workpiece 102. In the illustration, the probe axis 35 is slightly offset from the center line 111 of the hole 107. In order to use the invention, it is important that the offset not be more than the radius of the hole 107. Otherwise the point of the probe, when activated, will simply strike the top surface of the workpiece, and be unable to establish the hole location.

Figure 4A:
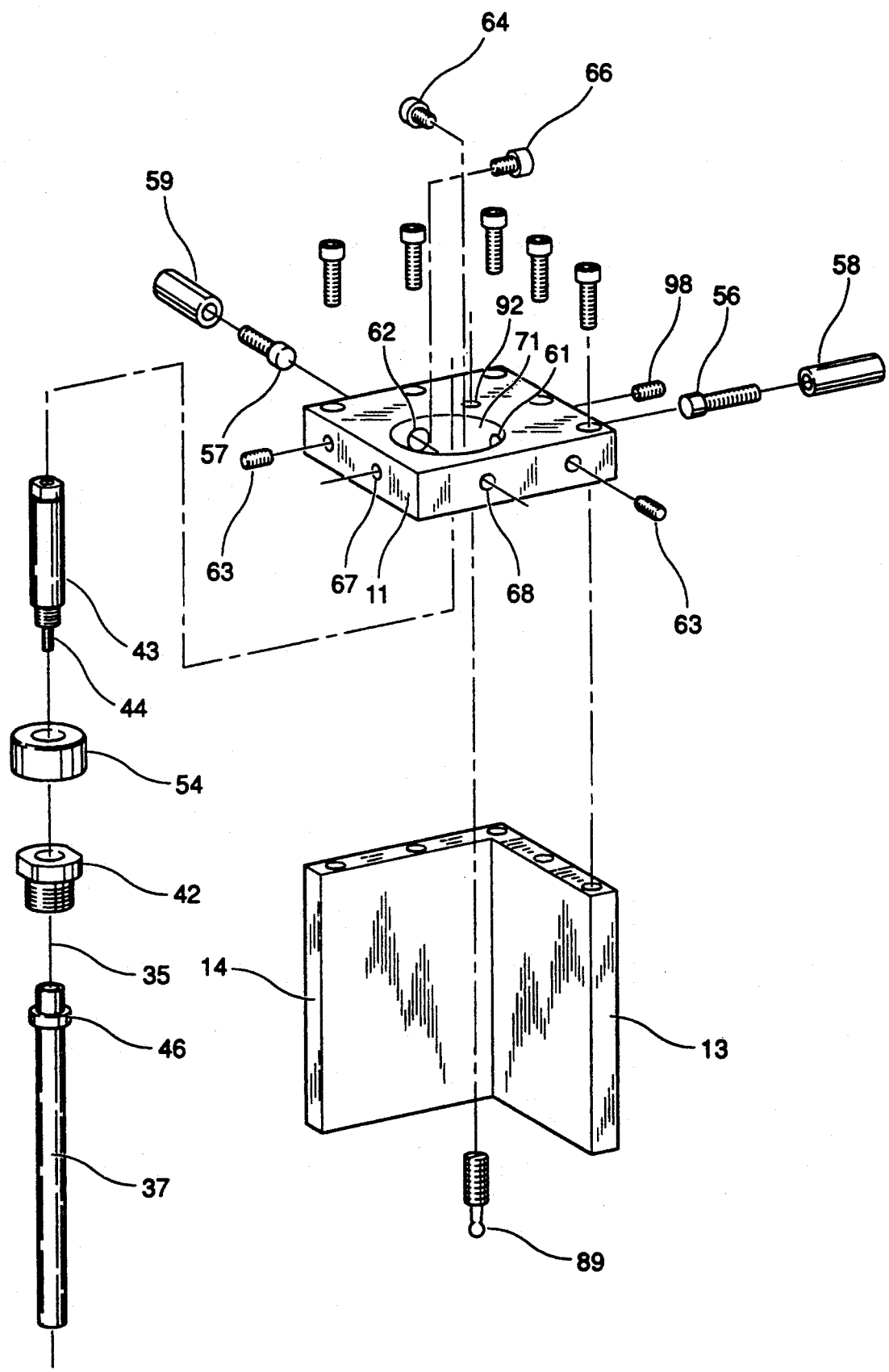
FIG. 4A is an exploded view of the upper portion of the gage assembly.
Figure 4B:
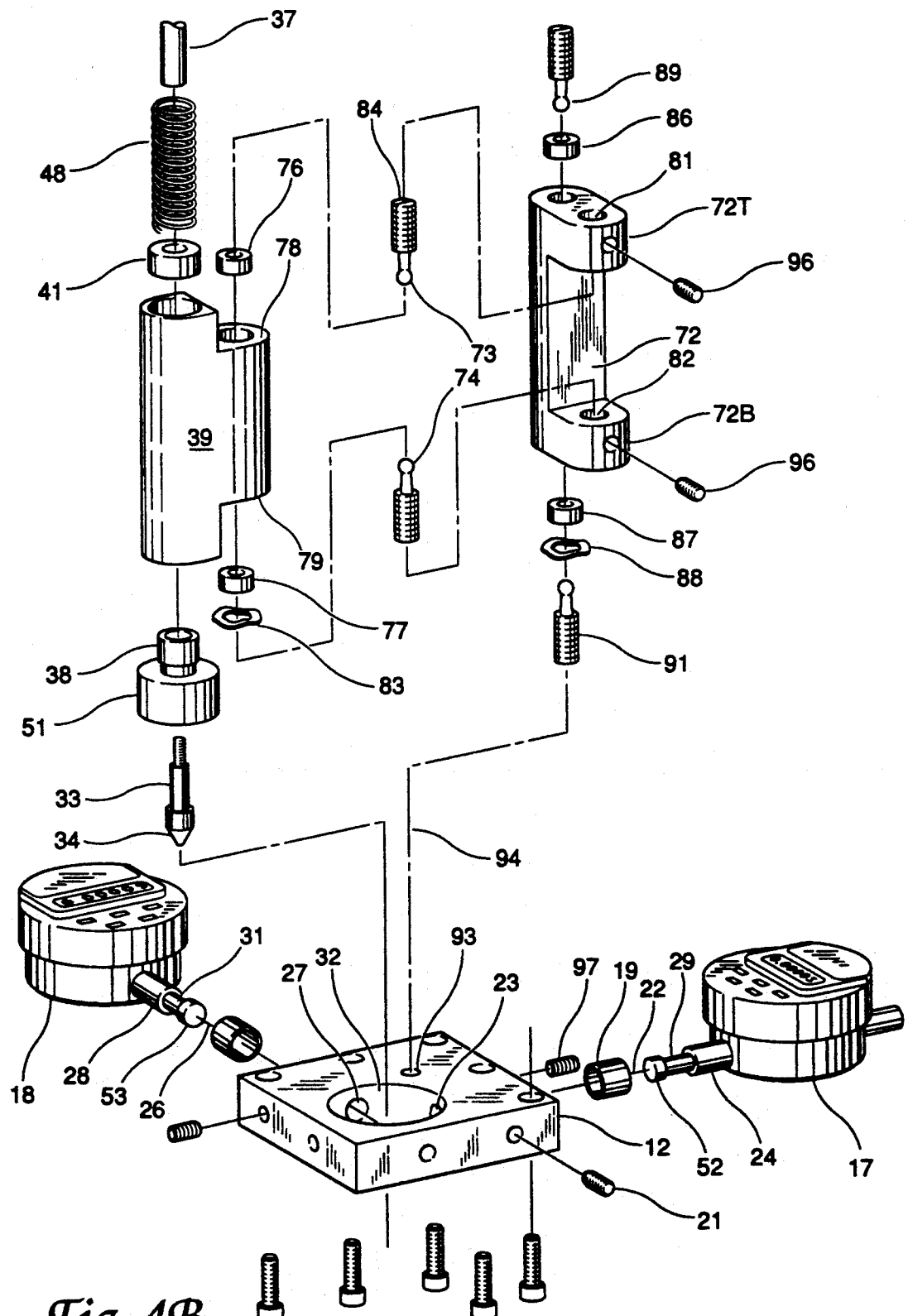
FIG. 4B is an exploded view of the lower portion of the gage assembly.

The unit is referenced by putting a gage master in place against the stops 103, 104 and 106, and actuating the pneumatic cylinder to drive the probe downward so that the probe point enters the hole. As the probe cone enters the hole, the probe will be moved laterally by the edge of the hole until the circular edge of the hole engages the cone in a complete circle. Then the gages 17 and 18 can be zeroed, or reference indications or readings can be noted. Typically, these gages are digital indicator gages having both a visual read-out on them and also electrical outputs to electronic dataprocessing equipment. An example is "The Fowler Ultra Digit" electronic indicator made in England and which can produce an output to a suitable data collector such as the DataMyte Model 352 by DataMyte Corporation of 14960 Industrial Road, Minnetonka, Minnesota 55345. The gage plunger is spring loaded to return to fully extended position as shown in FIG. 4B. When the reference hole position has been determined, the gaging master can be removed, and the workpiece to be inspected is installed against the stops 103, 104 and 106. Then the pressure is applied to the probe and, as the probe enters and centers in the hole, the arms will be moved to the extent needed to allow the probe axis to center in the hole. In other words, the arms pivot about their respective axes, the primary arm pivoting about the axis 94 in the frame, and the secondary arm pivoting about the axis in the primary arm. When the probe has centered in the hole, then the two indicator gages 17 and 18 will produce visual outputs on their respective indicator faces, and also to the dataprocessing equipment. The information can be stored or printed out. Then the air pressure is removed, whereupon the return spring 48 retracts the probe from the workpiece and another workpiece can be installed, and the procedure repeated.

The present invention provides for a relatively inexpensive device to make precision measurements of hole locations. It is important that the end faces of the gage anvils 52 and 53 are flat and lie in perpendicular planes, and that the cylindrical surface 51 be precisely concentric and coaxial with the point of the probe 34. However, according to the present invention, this can be accomplished with relatively little control otherwise. The tooling balls should fit within 0.0001 inches in the respective bushing holes. The wave springs minimize back-lash and keep the arms up, but without tightness, at all times. Clearances between the knuckles and the end play between them is not critical. Thus, the present invention is well adapted to achieving precise gaging with relatively low cost equipment. It should be noted here that position sensors other than the digital indicators 17 and 18 shown and described can be used. One example is a linear variable differential transducer (LVDT).

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

The invention claimed is:

1. A gage assembly to be mounted on a fixture to which workpieces to be measured can be fastened while measurements are made in mutually perpendicular X-axis and Y-axis coplanar coordinates, the assembly comprising:
    a frame mountable to the fixture;
    a first position sensor secured to the frame and having an operating plunger extending in the X-axis direction;
    a first pivot arm mounted to the frame to pivot about a first Z-axis perpendicular to a plane containing the X-axis and Y-axis;
    a second position sensor secured to the frame and having an operating plunger extending in the Y-axis direction;
    a second pivot arm mounted to the first pivot arm to pivot about a second axis parallel to the first axis; and
    a Z-axis probe guide secured to the second arm;
    a powered probe drive actuator secured to the second arm and having an output member drivable in the Z-axis direction; and
    a Z-axis probe connected to the output member and slidably mounted to the probe guide to slide in the Z-axis direction.

2. The assembly of claim 1 wherein:
    the position sensors are digital electronic indicators.

3. The assembly of claim 1 wherein:
    the position sensors are substantially identical.

4. The assembly of claim 1 wherein:
    said actuator is a pneumatic cylinder assembly and the output member is a piston rod.

5. The assembly of claim 1 and wherein:
    the plunger of the first position sensor is operably associated with the probe guide to effect a response in the first sensor to indicate an X-axis position of the probe; and
    the plunger of the second position sensor is operably associated with the probe guide to effect a response in the second sensor to indicate a Y-axis position of the probe.

6. The assembly of claim 5 and further comprising;
    a cylindrical anvil surface having its cylindrical axis colinear with the probe axis and resiliently engaged by anvils on the plungers of the position sensors.

7. A gage assembly to be mounted on a fixture to which workpieces to be measured can be fastened while measurements are made, the assembly comprising:
    a frame mountable to the fixture and having a base;
    a first position sensor secured to said base and having a sensor operating member movable along a first axis to produce a signal representative of the amount of movement in the direction of said axis;
    a tapered probe having an axis of symmetry;
    a ring associated with said probe and having an axis colinear with the probe axis; and
    arm means pivotally mounted to said base to pivot on a pivot axis parallel to the probe axis, and holding said probe and ring thereon in position engaging the position sensor operating member to cause activation of the sensor in response to movement of the probe in the direction of the first axis.

8. The assembly of claim 7 and further comprising:
    a second position sensor secured to the base and having a sensor operating member movable along a third axis perpendicular to the first axis and engaged by the ring to cause activation of the second position sensor in response to movement of the probe in a direction parallel to the third axis.

9. The assembly of claim 8 wherein:
    the arm means comprise two articulated arms, one of the arms being pivotally mounted to the frame and the other arm being pivotally mounted to the one arm.

10. The assembly of claim 9 and wherein the arms are mounted on tooling balls.

* * * * *